US009405436B2

(12) United States Patent
Dawson et al.

(10) Patent No.: US 9,405,436 B2
(45) Date of Patent: Aug. 2, 2016

(54) STANDARDIZED VISUAL INDICATORS IN ELECTRONIC MEDIA

(71) Applicant: INTERNATIONAL BUSINESS MACHINES CORPORATION, Armonk, NY (US)

(72) Inventors: Christopher J. Dawson, Arlington, VA (US); Rick A. Hamilton, II, Charlottesville, VA (US); Ruthie D. Lyle, Durham, NC (US); James W. Seaman, Falls Church, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 498 days.

(21) Appl. No.: 13/784,240

(22) Filed: Mar. 4, 2013

(65) Prior Publication Data
US 2013/0185659 A1    Jul. 18, 2013

Related U.S. Application Data

(63) Continuation of application No. 12/370,211, filed on Feb. 12, 2009, now Pat. No. 8,434,010.

(51) Int. Cl.
G06F 3/048 (2013.01)
G06F 3/0482 (2013.01)
G06Q 10/10 (2012.01)
H04L 12/58 (2006.01)

(52) U.S. Cl.
CPC ............ *G06F 3/0482* (2013.01); *G06Q 10/107* (2013.01); *H04L 12/581* (2013.01); *H04L 51/04* (2013.01)

(58) Field of Classification Search
CPC .................... G06F 3/04817; G06F 3/04842
USPC .................................. 715/759–765
See application file for complete search history.

(56) References Cited

U.S. PATENT DOCUMENTS

| 5,949,414 | A  | 9/1999  | Namikata et al.   |
|-----------|----|---------|-------------------|
| 6,202,066 | B1 | 3/2001  | Barkley et al.    |
| 6,385,627 | B1 | 5/2002  | Cragun            |
| 6,459,441 | B1 | 10/2002 | Perroux et al.    |
| 6,570,597 | B1 | 5/2003  | Seki et al.       |
| 6,910,186 | B2 | 6/2005  | Kim               |
| 6,954,902 | B2 | 10/2005 | Noma et al.       |
| 7,003,546 | B1 | 2/2006  | Cheah et al.      |
| 7,039,677 | B2 | 5/2006  | Fitzpatrick et al.|
| 7,086,011 | B2 | 8/2006  | Budrys et al.     |
| 7,434,169 | B2 | 10/2008 | Quillen et al.    |
| 7,468,729 | B1 | 12/2008 | Levinson          |
| 7,873,916 | B1 | 1/2011  | Chaudhri          |

(Continued)

*Primary Examiner* — Tadeese Hailu
(74) *Attorney, Agent, or Firm* — Matthew Chung; Andrew M. Calderon; Roberts, Mlotkowski, Safran & Cole PC

(57) ABSTRACT

Methods and systems for associating a standardized electronic icon with a user and displaying the icon with electronic communications of the user are disclosed. A computer implemented method includes: determining one or more icons to associate with an individual when the individual creates an electronic message; and at least one of selectively and automatically appending at least one of the one or more icons that are associated with the individual to the electronic message. The at least one of the one or more icons is subsequently displayed with the electronic message to a recipient to provide information about the individual to the recipient.

20 Claims, 6 Drawing Sheets

(56) References Cited

U.S. PATENT DOCUMENTS

| | | | |
|---|---|---|---|
| 2002/0196344 A1 | 12/2002 | McIntyre et al. | |
| 2003/0046296 A1* | 3/2003 | Doss | G06Q 10/109 |
| 2003/0142125 A1 | 7/2003 | Salmimaa et al. | |
| 2003/0154212 A1 | 8/2003 | Schirmer et al. | |
| 2004/0114735 A1 | 6/2004 | Arning et al. | |
| 2004/0119757 A1 | 6/2004 | Corley et al. | |
| 2004/0201624 A1 | 10/2004 | Crawford | |
| 2005/0188043 A1 | 8/2005 | Cortright et al. | |
| 2005/0289470 A1 | 12/2005 | Pabla et al. | |
| 2007/0022295 A1 | 1/2007 | Little et al. | |
| 2007/0032267 A1* | 2/2007 | Haitani | H04L 12/5835 455/556.2 |
| 2007/0282947 A1 | 12/2007 | Hupfer et al. | |
| 2008/0189654 A1 | 8/2008 | Thomas | |
| 2008/0222710 A1* | 9/2008 | Blagsvedt | G06F 3/04817 726/7 |
| 2009/0054092 A1 | 2/2009 | Stonefield et al. | |
| 2009/0094341 A1 | 4/2009 | Szeto | |
| 2009/0150968 A1 | 6/2009 | Ozzie et al. | |
| 2009/0164589 A1* | 6/2009 | Shroff | G06Q 10/10 709/206 |
| 2010/0105437 A1* | 4/2010 | Lee | H04M 1/576 455/566 |
| 2010/0135473 A1 | 6/2010 | Dewing et al. | |
| 2010/0162171 A1* | 6/2010 | Felt | H04M 1/27455 715/835 |

* cited by examiner

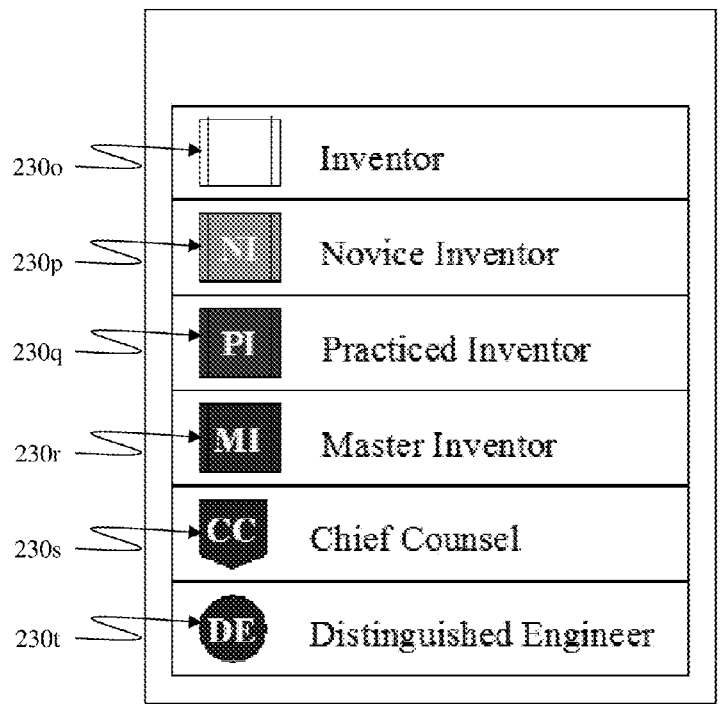
FIG. 6
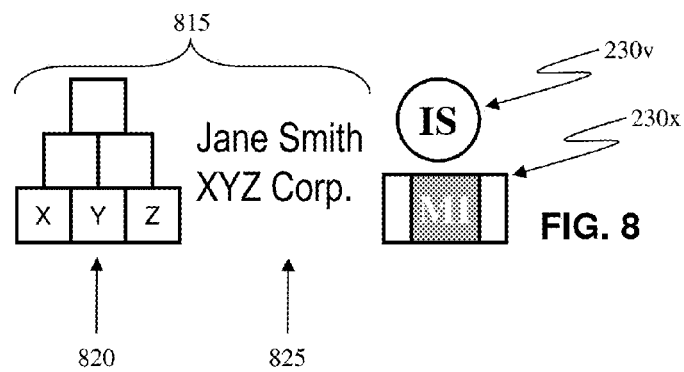
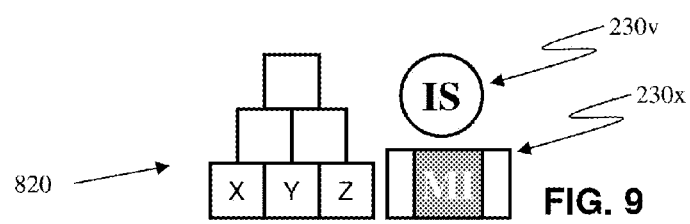
FIG. 8
FIG. 9

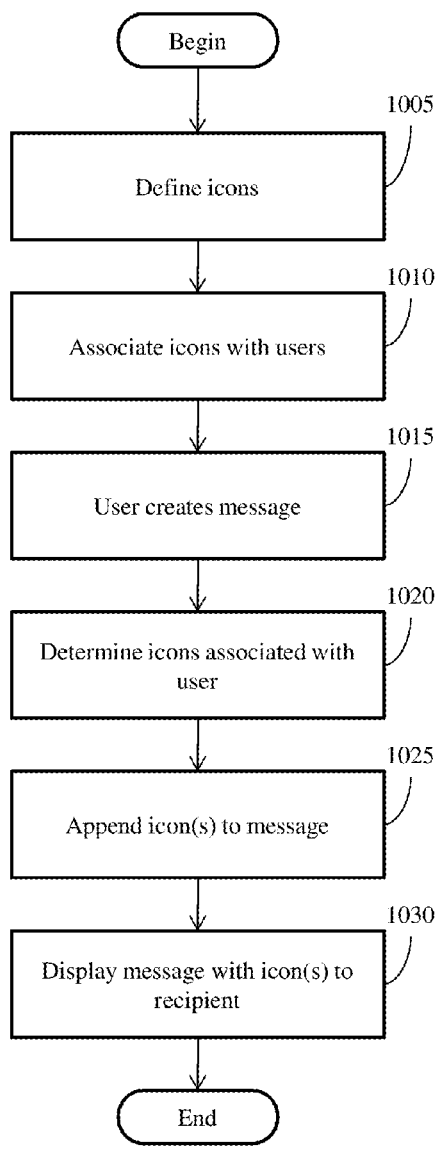
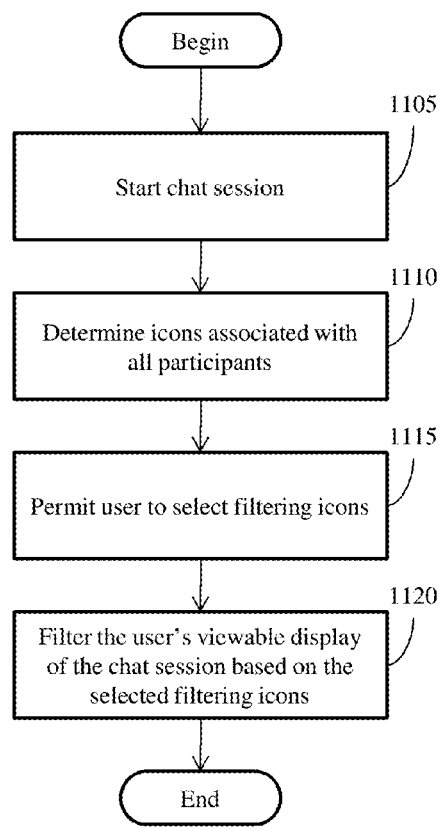
FIG. 10
FIG. 11

STANDARDIZED VISUAL INDICATORS IN ELECTRONIC MEDIA

FIELD OF THE INVENTION

The invention generally relates to electronic communication, and more particularly to methods and systems for associating a standardized electronic icon with a user and displaying the icon with electronic communications of the user.

BACKGROUND

Electronic communication mediums are becoming exceedingly popular forms of communication and collaboration. However, with the wide variety of electronic communication tools and formats, and the broad range of restrictions and personal preferences with respect to formatting of data, it is often difficult or impossible to quickly discern the role/expertise of a participant. As an example, during an instant real-time collaboration session with numerous (e.g., twenty or more) participants, it is unlikely that all members will know one another. In such an environment, the participants of the session do not have a basis for judging the value of any input provided by other unknown participants.

Additionally one or more persons working in the same organization may send email to an external client, each person having a different type and style of identifying electronic signature. This can be very confusing for the client.

Accordingly, there exists a need in the art to overcome the deficiencies and limitations described herein.

SUMMARY

In a first aspect of the invention, there is a computer implemented method for displaying standardized icons in electronic media, comprising: determining one or more icons to associate with an individual when the individual creates an electronic message; authenticating that the individual is approved to use at least one of the one or more icons; and at least one of selectively and automatically appending the at least one of the one or more icons that are associated with the individual to the electronic message. The at least one of the one or more icons is subsequently displayed with the electronic message to a recipient to provide information about the individual to the recipient. Also, a shape of the one or more icons signifies a first information, indicia associated with the shape signifies a second information different from the first information, and color of at least one of the shape and the indicia signifies a third information different from the first information and the second information.

In another aspect of the invention, there is a computer program product for displaying informational icons in electronic media, the computer program product comprising program code stored on a tangible storage medium. When executed on a computing device, the program code causes the computing device to: determine, for each respective participant of a chat session, at least one icon associated with the respective participant; display, for each respective participant, the at least one icon and an identity of the respective participant in a list of participants; and display, for each message by a respective participant, the at least one icon, the identity of the participant, and the message in a message area.

In another aspect of the invention, there is a system for displaying standardized icons in electronic media. The system comprises a computing infrastructure comprising a combination of hardware and software configured to: determine a plurality of icons associated with participants of an electronic collaboration session; present to each one of the participants a list of the plurality of icons; receive from at least one of the participants a selection of filtering icons selected from the list; and for each respective one of the participants that selected filtering icons, modify the viewable display of that respective one of the participants based on the filtering icons selected.

In another aspect of the invention, there is a method for displaying standardized icons in electronic media. The method comprises providing a computing infrastructure including a combination of hardware and software that is configured to: determine one or more icons to associate with an individual when the individual creates an electronic message; and at least one of selectively and automatically appending at least one of the one or more icons that are associated with the individual to the electronic message. The at least one of the one or more icons is subsequently displayed with the electronic message to a recipient to provide information about the individual to the recipient. A shape of the one or more icons signifies a first information. Indicia associated with the shape signifies a second information different from the first information. Color of at least one of the shape and the indicia signifies a third information different from both the first and second information.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 3-7 show exemplary icons in accordance with aspects of the invention;

FIGS. 8 and 9 show an exemplary implementation of non-real-time communications using icons in accordance with aspects of the invention; and FIGS. 10 and 11 show flow diagrams depicting implementations of methods according to aspects of the invention.

DETAILED DESCRIPTION

Figure 1:
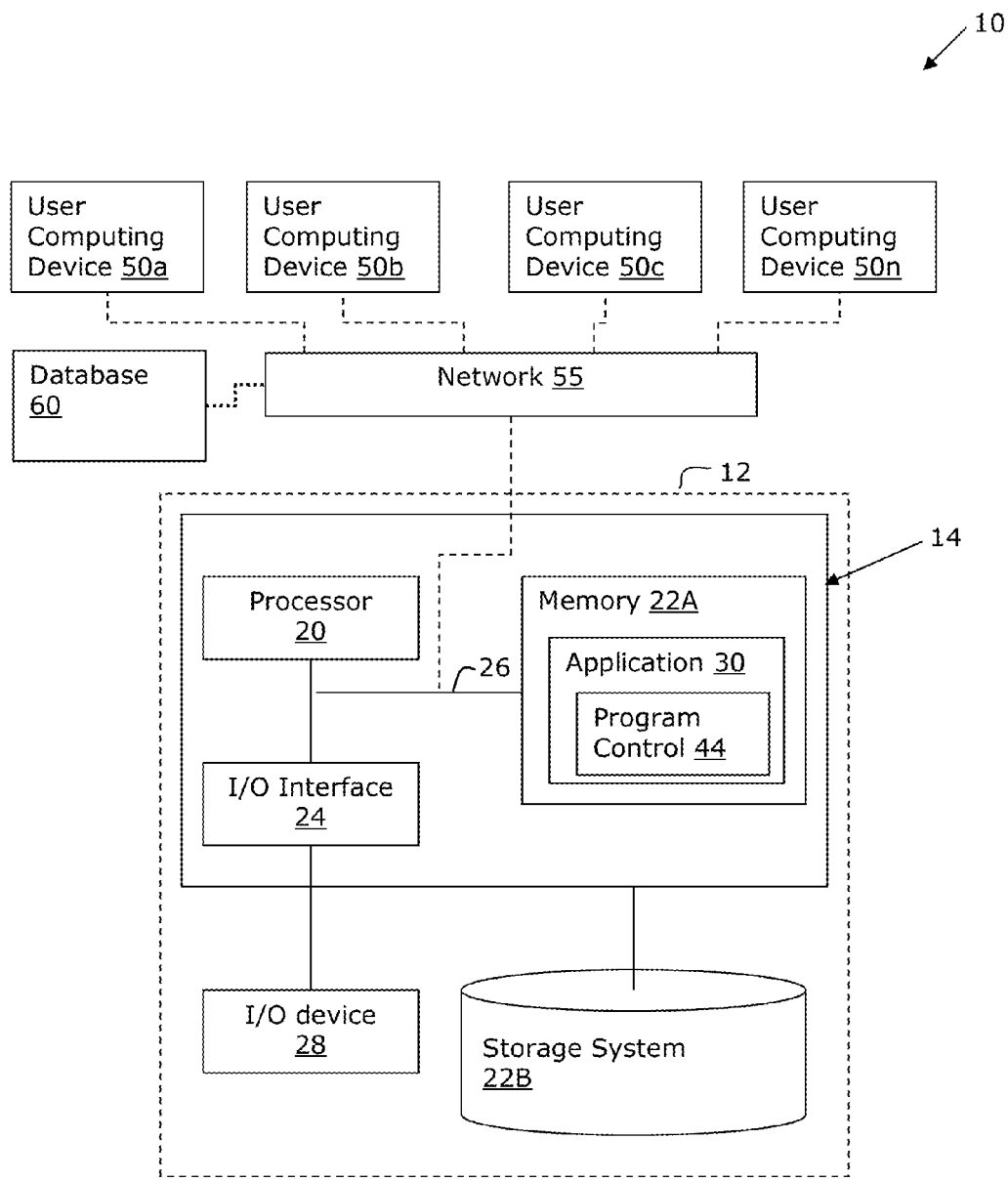
FIG. 1 shows an illustrative environment for implementing the steps in accordance with aspects of the invention.

The invention generally relates to electronic communication, and more particularly to methods and systems for associating a standardized electronic icon with a user and displaying the icon with electronic communications of the user. In embodiments, standardized icons are appended to electronic messages created by a user. The icons are representative of characteristics of the user (e.g., credentials, certifications, job title, etc.), such that recipients of the message may quickly ascertain such information about the user. The icons may be automatically or selectively appended to any suitable type of electronic communication messages, such as, for example, emails, instant messages, chat room messages, blog posts, forum posts, etc. Since the icons are standardized, implementations of the invention are multi-modal and provide for quick and easy determination of author characteristics across a number of different types of electronic communication media.

In embodiments, an employer, service provider, or other third party assigns appropriate icons to respective users. Icons may be assigned to users according to any criteria, including but not limited to, job role, job group, job title, achievements, certification, credentials, etc. Icons associated with a user may be stored in a database or file that is accessible by the user's electronic communication software, such that the icons can be appended to the user's electronic communication messages. Additionally, when a user creates and/or sends a message and attempts to append an icon to the message, an authentication may be performed to verify that the user is permitted to display the icon. In this manner, control of the standardized icons is maintained, such that recipients of a message from a user may rely on the authenticity of any icons appended to the message.

In accordance with additional aspects of the invention, the icons may be used as a basis for filtering electronic communications. For example, in a chat room environment, a user may choose to display only those messages from users having particular icons, while suppressing any messages from users who are not associated with the particular icons. Such filtering may be controlled by a user selecting which icons to filter (or by selecting which icons to not filter). Additionally or alternatively, the filtering may be performed automatically based on metadata or keywords associated with icons of a user. For example, when the subject matter of a collaboration session is determined to match the metadata or key words associated with a particular icon, then the user's viewable display of the collaboration session may be filtered to show only messages from other participants who are associated with that particular icon.

In further embodiments, icons may be automatically appended to an electronic message based on the intended recipient of the message. For example, in an email environment, a script may be used to automatically append icons that are common to the author and the recipient(s) of the email.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
 a portable computer diskette,
 a hard disk,
 a random access memory (RAM),
 a read-only memory (ROM),
 an erasable programmable read-only memory (EPROM or Flash memory),
 a portable compact disc read-only memory (CDROM),
 an optical storage device,
 a transmission media such as those supporting the Internet or an intranet, and/or
 a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that is operatively connected to any number of user computer devices 50a, 50b, 50c, . . . , 50n through a network 55. The computing device 14 comprises an application 30 written in program code (e.g., program control 44), which makes the computing device 14 operable to perform the processes described herein, such as, for example, determine icons associated with a user so that the user may append these icons to an electronic message. For example, the application 30 may function as a server that communicates with a software application (client, agent, etc.) on each user computer devices 50a, 50b, 50c, . . . , 50n to display icons with certain electronic communications.

According to aspects of the invention, one or more icons are defined using data stored in storage system 22B and/or database 60. As described in further detail herein, the icons may be indicative of any desired information, including, but not limited to, criteria, credentials, certifications, etc. of an individual. For example, each division or department within a company may have its own unique identifying icon which would be applied to each employee in that organization. As another example, a particular technical certification may have a unique icon associated with it, and an individual who has achieved this certification may be associated with this icon. Any number of icons may be defined, and a particular user may be associated with any number of the icons. In embodiments, an employer, service provider, or other third party defines the icons, and also determines (e.g., designates) which icons are associated with which individuals. As noted above, any desired criteria may be employed as the basis for associating an icon with an individual. Also, the association (e.g., designation) of icons with users may be performed on an ongoing basis, e.g., as credentials of users change.

In embodiments, icons associated with users are stored in a relational database (RDB) 60. The RDB 60 may optionally include additional database fields including more granular information about an individual as further described in the remainder of this disclosure. For example, when a user is logged on to a respective user computer device (e.g., 50*a*) and creates an electronic message (e.g., email, instant message, chat room post, blog entry, etc.), the computing device 14 (via program control 44) determines the icons associated with user from the RDB 60 and communicates these icons to the user computer device (e.g., 50*a*). In this manner, the user may choose to append any of the icons associated with him or her to the electronic message.

Additionally or alternatively, icon definitions may be kept in a file (e.g., in storage system 22B). Criteria associated with the icon definitions may be imposed against a user's register (e.g., in a user registry) to determine which icons a user is permitted to display in his or her messages. Such a file of icon definitions could be used with or without a database (e.g., RDB 60), and would be useful in an enterprise environment. When using a file of icon definitions, fields in the user registry (e.g., RDB 60) may include mapping definitions in the file to a particular icon. For example, when a user is logged on to a respective user computer device (e.g., 50*a*) and creates an electronic message, the computing device 14 (via program control 44) determines the icons associated with user from the user register, obtains the associated icons from the file, and communicates the icons to the user computer device (e.g., 50*a*). Accordingly, the user may choose to append any of the icons associated with him or her to the electronic message.

In additional embodiments, the computing device 14 operates (via programming code 44) to perform an authentication process for icons appended to an electronic message. It is possible that a user may obtain or create a copy of an icon that is not associated with that user (e.g., an icon which the user is not approved to use). It is further possible that the user may append this illicit icon to an electronic message. Accordingly, in embodiments, when a user attempts to send a message using a user computer device (e.g., 50*a*), the computing device 14 compares icons appended to the message to icons actually associated with the user. For example, the computing device 14 may determine which icons are appended to a message by comparing data in the message to data definitions of icons stored in the RDB 60 and/or icon definition file (e.g., stored in storage system 22B). Then, the computing device 14 may compare the icons that are appended to the message to the icons that the user is approved to use. When a message contains a particular icon that the user is not approved to use, the computing device 14 may automatically remove that particular icon from the message (e.g., by deleting the data that defines the icon from the message), or may prevent the message from being sent.

The computing device 14 includes a processor 20, a memory 22A, an input/output (I/O) interface 24, and a bus 26. The memory 22A can include local memory employed during actual execution of the program code, bulk storage, and cache memories which provide temporary storage of at least some the program code (e.g., program control 44) in order to reduce the number of times code must be retrieved from bulk storage during execution. Further, the computing device 14 is in communication with an external I/O device/resource 28 and a storage system 22B. The I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

The processor 20 executes the computer program code (e.g., program control 44), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 and respective user computer devices 50*a*, 50*b*, 50*c*, . . . , 50*n* can comprise any general purpose computing article of manufacture capable of executing computer program code installed thereon (e.g., a personal computer, server, wireless notebook, smart telephone, personal digital assistant, etc.). However, it is understood that the computing device 14 and user computer devices 50*a*, 50*b*, 50*c*, . . . , 50*n* are only representative of various possible equivalent computing devices that may perform the processes described herein. To this extent, in embodiments, the functionality provided by the computing device 14 and user computer devices 50*a*, 50*b*, 50*c*, . . . , 50*n* can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a primary service provider, such as a Solution Integrator, could offer to perform the processes described herein. In this case, the primary service provider can create, maintain, deploy, support, etc., a computer infrastructure that performs the process steps of the invention for one or more customers. In return, the primary service provider can receive payment from the customer(s) under a subscription and/or fee agreement and/or the primary service provider can receive payment from the sale of advertising content to one or more third parties.

Exemplary Icons

Figure 2:
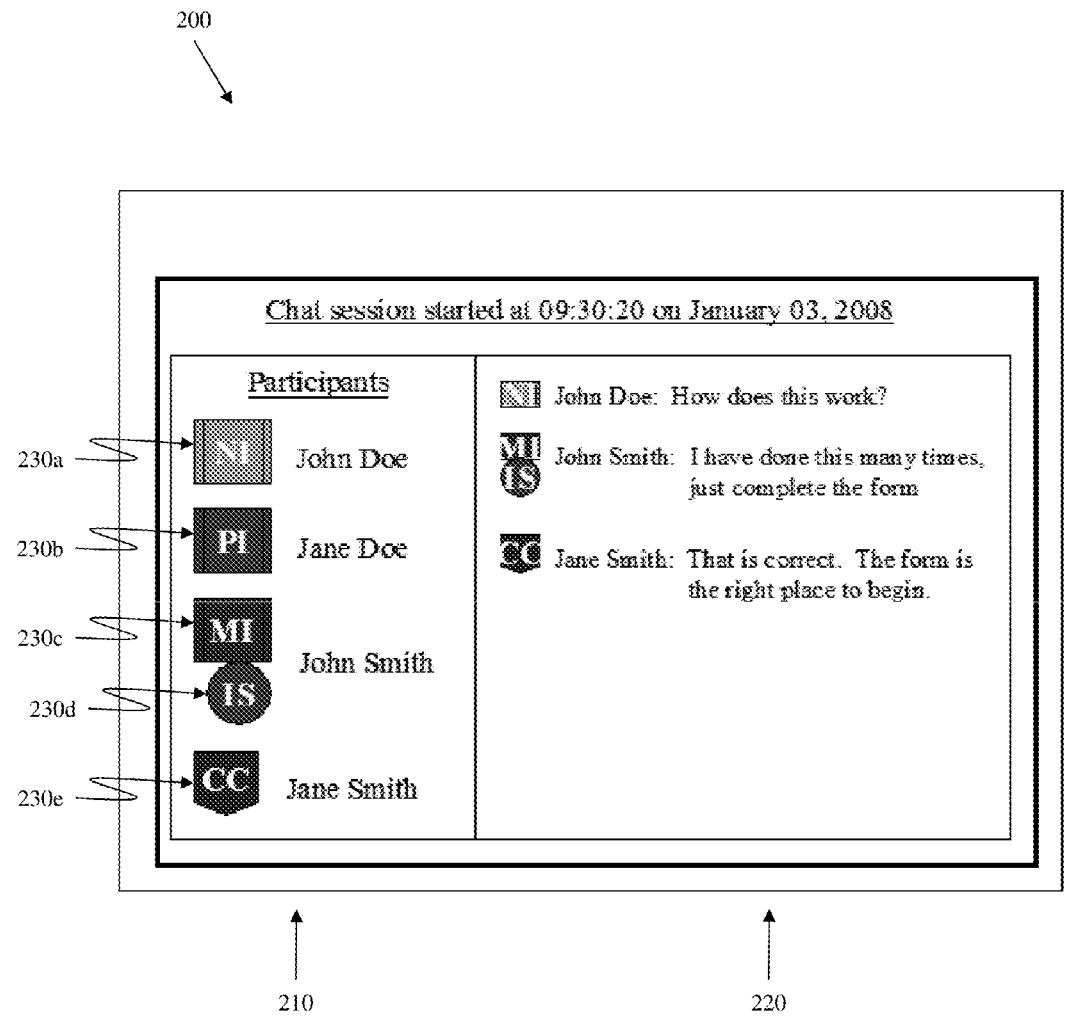
FIG. 2 shows an exemplary implementation of a real-time communication using icons in accordance with aspects of the invention.

FIG. 2 shows an exemplary implementation of a real-time communication using icons in accordance with aspects of the invention. In a collaborative session where a user does not know each of the other participants, it is advantageous for the user to be able to quickly ascertain the various roles of the unknown participants. For example, in dynamic collaborative environments (e.g., chat sessions, etc.), it is helpful to understand as much about each participant as quickly as possible.

More specifically, FIG. 2 shows an exemplary display 200 of a chat session utilizing icons in accordance with aspects of the invention. The display 200 includes a list of participants 210 and a message area 220. Each participant has an icon 230a-e displayed next to their name in the list of participants 210. As described herein, each respective icon 230a-e may have a distinct shape, color, text, etc., that signifies predefined information about the participant that the icon is associated with. For example, and as described in more detail below with respect to FIGS. 3-7, the shape, text, and color of icon 230d may indicate that John Smith is a Senior I/T Specialist in the Services Division of the organization. Additionally, the shape, text, and color of icon 230e may indicate that Jane Smith is Chief Counsel in the Law Office. In this manner, observers of the chat session may instantly ascertain information about the other participants of the chat session by looking at the icons.

As depicted in FIG. 2, a participant may have one icon (e.g., 230a) or more than one icon (e.g., 230c, 230d) displayed next to their name. Additionally, a participant may have zero icons displayed next to their name. Moreover, two or more participants may have common icons.

Additionally, when a participant sends an electronic message to the chat session, their respective icon is displayed along with their name next to their message in the message area 220. In this manner, observers of the chat session (e.g., other participants, etc.) may quickly ascertain useful information about a participant who has posted a message from the icons.

In accordance with aspects of the invention, the chat session in FIG. 2 may be implemented using the environment described with respect to FIG. 1. For example, each participant may be logged on to a respective user computer device (e.g., 50a, 50b, etc.), and a definition of the icons 230a-e displayed next to the users may be stored in a database (e.g., database 60) and/or an icon definition file (e.g., stored in storage system 22B). In such an environment, the computing device 14 may operate (e.g., via program control 44) to append the appropriate icons 230a-e to the participant names in the participant list 210 and to the messages in the message area 220.

Although particular examples of icons are shown in FIG. 2, the invention is not limited to these examples. Instead, any suitable types of icons (e.g., size, shape, color, text, etc.) may be used within the scope of the invention. Moreover, icons may be used with any real-time communication, and the invention is not limited to use with chat sessions.

FIGS. 3-7 show exemplary icons in accordance with aspects of the invention. The icons shown are merely illustrative, and the invention is not limited to the icons depicted in FIGS. 3-7. Instead, the exemplary icons are used to illustrate how icons of different shapes, colors, text, etc., may be used as standardized indicators of information about people.

Figure 3:
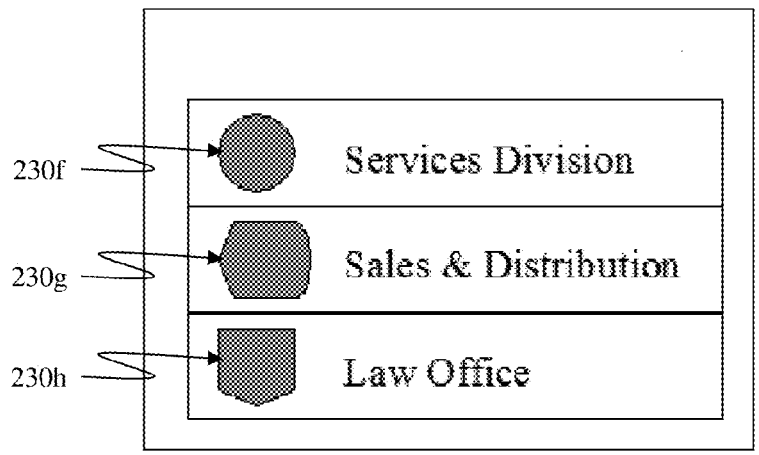

More specifically, FIG. 3 demonstrates that the shape of the icon may be indicative of a department within an organization. For example, an icon 230f having a first shape may represent that an individual is in the Services Division, an icon 230g having a second shape may represent that an individual is in Sales and Distribution, and an icon 230h having a third shape may represent that an individual is in the Law Office. Accordingly, all people in the Services Division would have an icon having the first shape (e.g., icon 230f) associated with them and available to them for use with their electronic communications. In this manner, when a recipient receives an electronic communication from a user, and that communication includes an icon having the first shape (e.g., icon 230f), the recipient will immediately be able to determine from the icon that the author of the message is a member of the Services Division. In further embodiments, the shapes are intuitively linked with the information that they convey. For example, a cog shape may be used to represent people in an engineering department.

Figure 4:
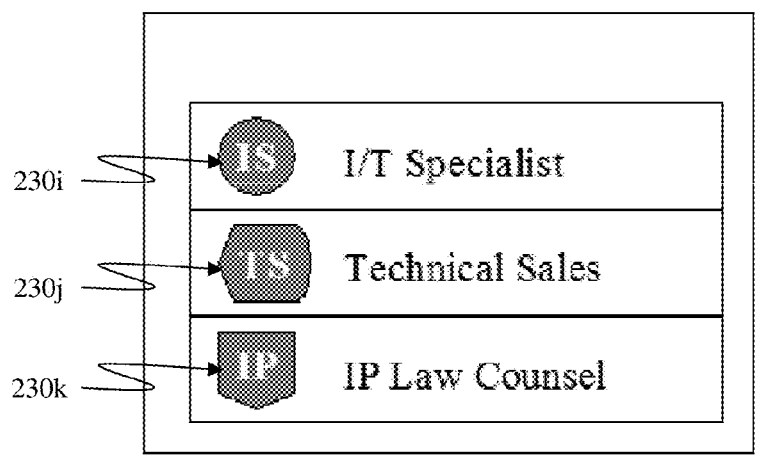

FIG. 4 continues the example of FIG. 3, and depicts how additional data may be added to each icon to provide even further information about an individual. By using acronyms, initials, abbreviations and/or graphics, individual status with additional granularity can be understood at a glance. For example, an icon 230i having the text "IS" included within the first shape indicates that an individual is an I/T Specialist within the Services Division. Similarly, an icon 230j having the text "TS" within the second shape indicates that the user is in Technical Sales in Sales and Distribution. Also, an icon 230k having the text "IP" within the third shape indicates that the individual is an IP Law Counsel in the Law Office. In this manner, text or other indicia may be added to the shapes (e.g., from FIG. 2) to further identify an individual's role within the organization represented by the shape.

Figure 5:
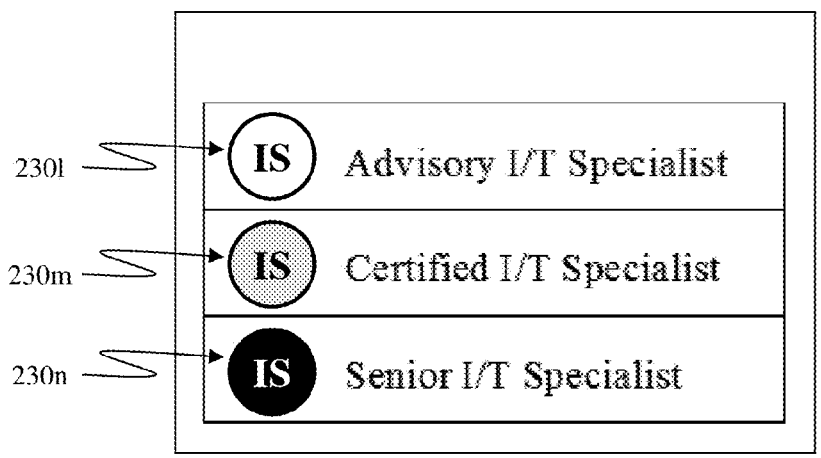

FIG. 5 continues the example of FIGS. 3 and 4, and demonstrates how an additional level of informational granularity may be added to each icon using color (texture, pattern, etc.). For example, in addition to shape and text, color may be used with an icon to designate, e.g., seniority or career stage of an individual. Particularly, in FIG. 5 the first color may indicate an Advisory level employee. As described above with respect to FIGS. 3 and 4, the first shape and text "IS" indicate an I/T Specialist in the Services Division. Therefore, an icon 230l having the combination of the first color, first shape, and text "IS" indicates an Advisory I/T Specialist in the Services Division. Similarly, an icon 230m having the second color, first shape, and text "IS" may represent a Certified I/T Specialist in the Services Division. Likewise, an icon 230n having the third color, first shape, and text "IS" may represent a Senior I/T Specialist in the Services Division.

The shapes, text, and colors of the icons described thus far are merely exemplary, and any desired number icons of different combinations of shape, text, color, may be used within the scope of the invention. For example, FIG. 6 shows additional icons 230o-230t that designate other types of information about an individual.

Figure 7:
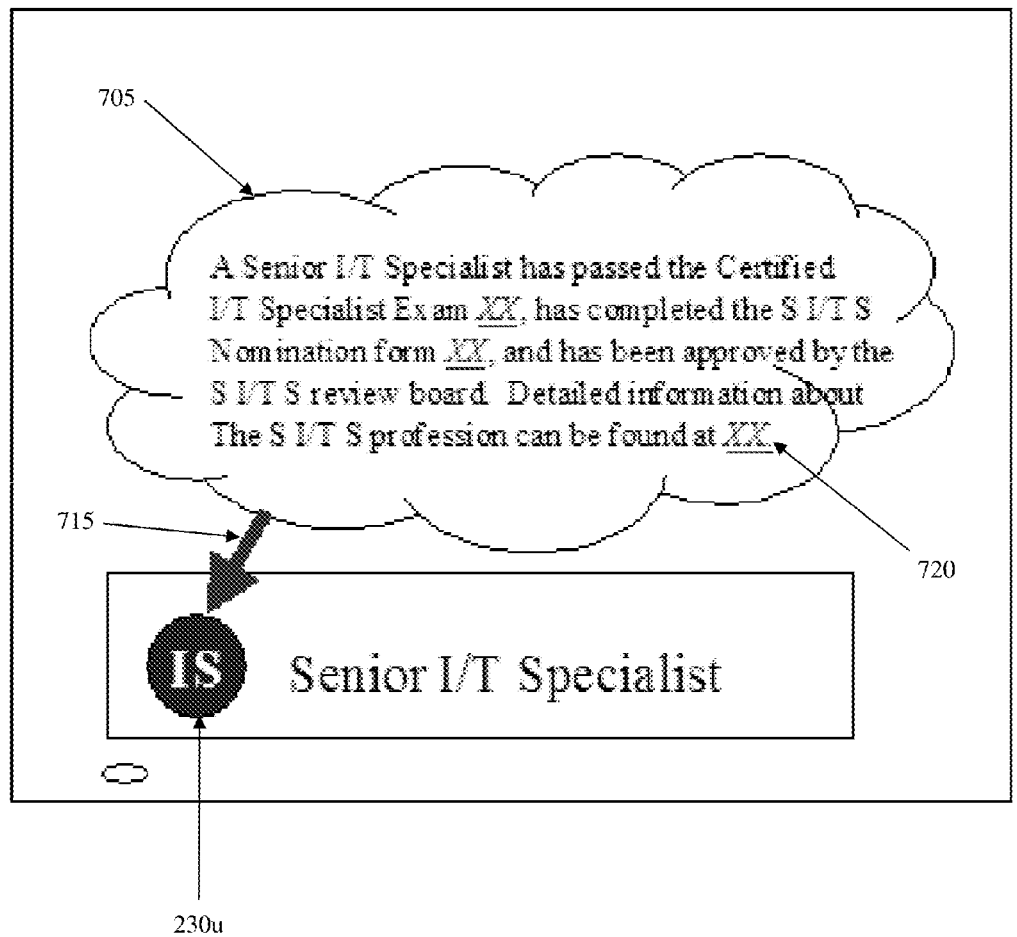

FIG. 7 depicts an embodiment where additional information 705 is associated with an icon 230u, and is displayed when a user positions their mouse 715 over the icon 230u. In this manner, when a user observes an icon in a chat session (e.g., as depicted in FIG. 2), the user may "mouse-over" the icon to view the additional information. The additional information 705 may be any desired information, and may include hyperlinks 720. The additional information 705 may be stored in the same location as the icon (e.g., database 60, storage system 22B, etc.). In embodiments, the computing device 14 is configured to provide the information to a user computer device (e.g., 50a) when the mouse pointer on the user computer device is detected over the icon 230u. The information may include, for example, the definition of the icon and associated identification information, such as, for example, as discussed with respect to FIGS. 2-6.

FIGS. 8 and 9 depict examples of icons 230v, 230x appended to a non-real-time electronic communication, such as a signature 815 of an email message. The signature 815 may comprise plural portions, such as a logo 820 and a text signature 825 as shown in FIG. 8. Alternatively, the signature 815 may comprise a single portion (e.g., logo 820) and one or more icons (e.g., 230v, 230x). Thus, the standardized icons described herein are not limited being used with (e.g., appended to) chat session communications (e.g., FIG. 2). Rather, the icons described herein may be used with any form of electronic communication, such as email (e.g., FIGS. 8 and 9), blog posts, forum posts, etc.

In embodiments, an employer, service provider, or other third party defines the various icons and the information associated with each icon. The same employer, service provider, or other third party may designate which icons apply to which individuals. Data defining the icons and designations of respective icons with individuals may be stored in a database (e.g., database 60) or file (e.g., resident in storage system 22B) as described above with respect to FIG. 1, and may be updated on a routine and/or as-needed basis (e.g., due to a change in status of a user). The information may be obtained by third parties in order to understand the icon. Then, when an individual creates an electronic message (e.g., using user computer device 50a), any one or more of the icons associated with the individual may be appended to that message.

In additional embodiments, an icon can be used to display historical information about the individual using the icon. That is to say, data associated with a first user's past employment divisions, departments, roles, etc., may be stored and linked to an icon associated with that first user. Then, for example, when a second user right-clicks on the icon (e.g., in an email received from the first user), the computing device 14 could display the historical information about the first user.

Appending Icons to Messages

In embodiments, an individual creating an electronic communication (e.g., using user computer device 50a) may automatically and/or selectively append any of the icons associated with them to the message. For example, the computing device 14 may be configured to cooperate with the email program of the user computer device 50a to provide the individual with a pull-down menu of available icons for appending to an email message. In this manner, the individual has the option of selecting, from all of his or her approved icons, those to be displayed with a particular message. Although this example is described with respect to email, the selective appending described herein is equally useable with any other form of electronic message (e.g., chat session, blog post, forum post, etc.).

In additional embodiments, the individual may be permitted to specify that certain icons are automatically appended to each message in a particular communication medium. For example, the computing device 14 may be configured to cooperate with the email program of the user computer device 50a to permit the individual to specify that a particular icon is to be automatically appended to each outgoing email. Then, when the individual creates a new email, the specified icon is automatically included in the email message.

Moreover, different icons may be automatically appended to messages based on the type of communication medium being utilized. For example, in addition to the icons automatically added to emails as described above, the computing device 14 may be configured to cooperate with the chat session program of the user computer device 50a to permit the individual to specify that a particular icon is to be automatically appended to chat session messages. The icons automatically added to emails may be the same or different than the icons automatically added to chat session messages.

In additional embodiments, one or more icons may be automatically attached to an email message based on the recipient of the email message. More specifically, the computing device 14 may operate to compare the icons associated with the author of the email message to the icons associated with the recipient of the email message (e.g., defined on the "To" field of the email message). Any icons that are common to both individuals are automatically appended to the email message. In this manner, the automatic appending of icons is targeted to the intended audience of the message.

Furthermore, selective appending of icons may be used in combination with automatic appending. For example, in addition to one or more icons being automatically appended to an email message, the user may also selectively add other approved icons (e.g., via drop-down menu) to the same email message.

As previously described with respect to FIG. 1, an authentication procedure may optionally be performed to verify that icons appended to any electronic communication are approved for use by the author of the message. In embodiments, this authentication procedure is performed at least in part by the computing device 14 comparing the icons appended to the message to the icons approved for use by the individual creating the message. When an unapproved icon is detected in a message, the computing device 14 may strip the unapproved icon from the message when then message is sent (e.g., so that any recipient of the message will not see the unapproved icon). Additionally or alternatively, when an unapproved icon is detected in a message, the computing device 14 may prevent the message from being sent until the unapproved icon is removed. For example, an error message or warning may be displayed on the user computer device 50a instructing the individual to remove the unapproved icon from the message.

Filtering Based on Icons

In additional embodiments, the icons associated with an individual may be used as a basis for filtering electronic communications. For example, in a chat session environment, an individual may select one or more icons (e.g., from a drop-down menu), and only messages from users having those selected icons will be displayed on the individual's view of the chat session. In this manner, the individual may selectively filter (e.g., not view) messages from other users that are not associated with the selected icon(s). In embodiments, the computing device 14 determines all of the icons associated with all of the participants of the chat session, and presents the individual (e.g., via user computer device 50a) with a pull-down menu from which to select filtering icons.

Additionally or alternatively, filtering may be performed automatically based on predefined metadata associated with icons. More specifically, in embodiments, a user may specify (e.g., in an electronically stored user profile) metadata associated with any of the icons associated with (e.g., approved for use by) that user. The computing device 14 may be configured to scan the text of messages of a collaboration session for such metadata. When metadata associated with a particular icon is found, the computing device 14 operates to modify the user's viewable display of the collaboration session to show only messages from other participants who are associated with that particular icon.

Exemplary Processes of the Invention

FIGS. 10 and 11 are an illustrative exemplary process in accordance with the present invention. The steps of FIGS. 10 and 11 may be implemented on the computer infrastructure of environment of FIG. 1. The flow diagrams in FIGS. 10 and 11 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environments of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

More specifically, FIG. 10 shows a flow diagram depicting steps of a method in accordance with aspects of the invention. At step 1005, an employer, service provider, or other entity define and electronically stores one or more icons. The icons may be similar to those described with respect to FIGS. 2-9, and may have any desired shape, indicia, color, etc., to stand for any desired information (e.g., job title, job rank, certification, achievements, etc.). Data defining the icons may be stored, for example, in a database (e.g., database 60) or in a file (e.g., stored in storage system 22B).

At step 1010, the employer, service provider, or other entity associated certain ones of the icons defined in step 1005 with individuals. The associations may be based on any suitable criteria. As described above with respect to FIG. 1, icons associated with each individual (or a pointer to such icons) may be stored in a database entry or file (e.g., electronic user profile) associated with the user.

At step 1015, a user utilizes a user computing device (e.g., user computer device 50*a*) to create an electronic message. This may be performed in a conventional manner using conventional electronic messaging software (e.g., email, chat session, etc.).

At step 1020, a program control (e.g., program control 44 of computing device 14 described with respect to FIG. 1) determines the icons that are associated with the user that is creating the message at step 1015. In embodiments, the program control looks up the icons in the database or file based on the user's identity, as described above with respect to FIG. 1.

At step 1025, one or more of the icons determined in step 1020 are appended to (e.g., attached to, included in, etc.) the electronic message. This may be performed as already described herein. For example, the user may selectively append icons based on a list of available icons shown in a drop-down menu. Additionally or alternatively, icons may be automatically appended to the message based on the type of message (e.g., email, chat session, blog, forum, etc.). Additionally or alternatively, icons may be automatically appended to the message based on any other factors, such as icons that are common between the user creating the message and the identified recipient of the message.

At step 1030, the message is transmitted and displayed to the recipient(s), with the icons from step 1025 being displayed with the message. For example, the server computing device (e.g., computing device 14) communicates with the various user computer devices (e.g., user computer devices 50*a*, . . . , 50*n*) to transmit and display the message with the one or more icons included with the message.

FIG. 11 shows a flow diagram depicting steps of another process in accordance with aspects of the invention. At step 1105, a chat session is started in a conventional manner. At step 1110, a program control (e.g., program control 44) determines all of the icons associated with the respective participants of the chat session. This may be performed, for example, as described herein by looking up each user's associated icons in the database (e.g., database 60) or data file (e.g., stored in storage system 22B).

At step 1115, the program control presents a user (e.g., an individual participant of the chat session) with the option to filter the chat session based on the icons determined in step 1110. For example, the program control may cooperate with the user computer device (e.g., user computer device 50*a*) to display a drop-down menu of all of the icons determined at step 1110. The user may select one or more icons from the drop-down menu as filtering icons.

At step 1120, the program control filters the user's viewable display of the chat session based on the filtering icons selected in step 1115. In embodiments, the program control cooperates with the user computer device to modify the user's viewable display of the chat session to show messages only from participants that are associated with one or more of the filtering icons.

Aspects of the invention are multi-modal, such that implementations of the invention enables useful secondary functions such as visual indicator filtering based on communication forum and context, discussion topic, target party or audience, and the like. For example, during a chat session between users having different job roles (e.g., sales people, installation people, inventors, and invention evaluators), each one of the user may filter his or her viewable display of the chat session based on icons associated with the various participants.

Moreover, the visual indicators provided in embodiments of the present invention are context independent and can be meaningful outside of the context of the original electronic communication. As an example, an email sent to a third party including a Certified CNE indicator would be broadly meaningful to the recipient.

Implementations of the invention can be used to display different icons to different people based on role, location, or other attributes. For example, different icons may be automatically appended to different messages based on any number of factors, such as commonality of icons between sender and recipient.

Moreover, because aspects of the invention are multimodal, the visual indicators described herein are not limited to visibility within a single application. Rather, embodiments of the invention provide a mechanism to display such visual indicators in a plurality of external applications. For example, the same icon may be used with an email application, a chat session application, and blog and forum posts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, where applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A computer program product for displaying informational icons in electronic media, the computer program product comprising program code stored on a tangible storage medium, which, when executed on a computing device, causes the computing device to:
   determine, based on a user registry, for each respective participant of a chat session, at least one icon permitted to be used by the respective participant, wherein:
      said at least one icon is a predefined standardized icon indicative of one or more predefined categories of users, and
      said user registry associates each respective participant with one or more icons permitted for use by the respective participant based on criteria associated with the one or more icons;
   display, for each respective participant whose permission to use a selected icon has been authenticated based on the user registry, the selected icon and an identity of the respective participant in a list of participants; and
   display, for each text message created by a respective participant, the selected icon, the identity of the participant, and the text message in a message area.

2. The computer program product of claim 1, wherein:
   a shape of the at least one icon signifies a first type of information about the respective participant,
   indicia associated with the shape signifies a second type of information about the respective participant, and
   color of at least one of the shape and the indicia signifies a third type of information about the respective participant.

3. The computer program product of claim 1, further comprising displaying additional information about a respective participant when a user places a mouse pointer over the selected icon.

4. The computer program product of claim 3, wherein the additional information contains at least one hyperlink.

5. The computer program product of claim 1, wherein each respective participant is permitted to select the at least one icon from a menu of approved icons associated with that respective participant by the user registry.

6. The computer program product of claim 5, wherein the menu of approved icons comprises multiple approved icons.

7. The computer program product of claim 1, further comprising suppressing text messages for each respective participant whose permission to use a selected icon has not been authenticated based on the user registry.

8. The computer program product of claim 1, wherein the authenticating comprises comparing the selected icon individual with the one or more icons permitted for use by the respective participant.

9. The computer program product of claim 1, wherein the one or more predefined categories of users constitutes employment related information.

10. The computer program product of claim 9, wherein the employment related information is selected from the group consisting of credentials, certifications, division or department of an organization, job title, job rank, achievements and combinations thereof.

11. The computer program product of claim 1, wherein the one or more predefined categories of users are defined by an employer.

12. A computer implemented method for displaying standardized icons in electronic media, comprising:
   determining, for an individual participating in a text messaging session, one or more predefined standardized icons associated with an identity of the individual, the one or more icons being a predetermined set of icons permitted to be used by the individual;
   authenticating that a selected icon is one of the one or more predefined icons associated with an identity of the individual; and
   selectively displaying the selected icon to one or more other individuals participating in the text messaging session based on the authenticating;
   wherein:
      the one or more predefined icons associated with the identity of the individual are standardized indicators of one or more predefined categories of users, and
      the association between the identity of the individual and the one or more predefined icons is determined based on criteria associated with the one or more icons.

13. The computer implemented method of claim 12, wherein:
   shapes of the one or more predefined icons signify a first type of information about the individual,
   indicia associated with the shapes signify a second type of information about the individual, and
   colors of at least one of the shapes and the indicia signify a third type of information about the individual.

14. The computer implemented method of claim 12, further comprising displaying additional information about the individual when the one or more other individuals place a mouse pointer over the display of the selected icon.

15. The computer implemented method of claim 14, wherein the additional information includes hyperlink.

16. The computer implemented method of claim 12, wherein:
   the determining the one or more predefined icons comprises displaying a menu including the one or more predefined icons; and
   the authenticating comprises receiving a selection from the menu.

17. The computer implemented method of claim 16, wherein the menu of approved icons comprises multiple approved icons.

18. The computer implemented method of claim 12, wherein the one or more predefined categories of users constitutes employment related information.

19. The computer implemented method of claim 18, wherein the employment related information is selected from the group consisting of credentials, certifications, division or department of an organization, job title, job rank, achievements and combinations thereof.

20. The computer implemented method of claim 12, wherein the one or more predefined categories of users are defined by an employer.

\* \* \* \* \*